United States Patent
Roux

(10) Patent No.: US 8,523,061 B2
(45) Date of Patent: Sep. 3, 2013

(54) SYSTEM AND METHOD FOR VALIDATING THAT FARES HAVE BEEN PAID

(75) Inventor: Pascal Roux, Chabeuil (FR)

(73) Assignee: Affiliated Computer Services Solutions France S.A.S., Guilherand Granges (FR)

( * ) Notice: Subject to any disclaimer, the term of this patent is extended or adjusted under 35 U.S.C. 154(b) by 0 days.

(21) Appl. No.: 13/420,261

(22) Filed: Mar. 14, 2012

(65) Prior Publication Data

US 2012/0234914 A1 Sep. 20, 2012

(30) Foreign Application Priority Data

Mar. 15, 2011 (FR) ...................................... 11 52076

(51) Int. Cl.
*G06K 5/00* (2006.01)
*G06F 7/08* (2006.01)

(52) U.S. Cl.
USPC .......................................... 235/380; 235/381

(58) Field of Classification Search
USPC .................. 235/379, 382, 381, 380
See application file for complete search history.

(56) References Cited

U.S. PATENT DOCUMENTS

| | | | |
|---|---|---|---|
| 6,609,114 B1* | 8/2003 | Gressel et al. | 705/50 |
| 8,332,922 B2* | 12/2012 | Dickinson et al. | 726/10 |
| 2009/0113538 A1* | 4/2009 | Eom et al. | 726/12 |
| 2009/0283591 A1 | 11/2009 | Silbernagl | |
| 2010/0311496 A1* | 12/2010 | Taylor et al. | 463/25 |
| 2011/0010543 A1* | 1/2011 | Schmidt et al. | 713/168 |
| 2012/0255994 A1* | 10/2012 | Silbernagl | 235/379 |

OTHER PUBLICATIONS

Foreign communication from a counterpart application, French application 1152076, Preliminary Research Report dated Mar. 15, 2011, 3 pages.
Foreign communication from a counterpart application, French application 1152076, Written Opinion dated Mar. 15, 2011, 4 pages.

* cited by examiner

*Primary Examiner* — Thien M Le
(74) *Attorney, Agent, or Firm* — Conley Rose, P.C.; Grant Rodolph

(57) ABSTRACT

The invention relates to a control terminal (20) for determining whether a fare has been paid comprising: a reader (22) for reading a fare card identification number from a fare card; a processing module (25) adapted to implement a one-way function to generate a control number from a fare card identification number; and a comparison unit (27) for comparing the control number to a reference list.

24 Claims, 2 Drawing Sheets

SYSTEM AND METHOD FOR VALIDATING THAT FARES HAVE BEEN PAID

CROSS-REFERENCE TO RELATED APPLICATIONS

The present application claims priority to French patent application Ser. No. 11/52076 filed Mar. 15, 2011, which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to a system for controlling fares. It more particularly relates to a system for controlling the validation of fare cards in a transit system wherein bank cards can be used as fare cards.

2. Background and Relevant Information

Public transit systems offering the possibility of using a bank card or equivalent as a fare card provide users with great flexibility, the latter not having to preoccupy themselves with a specific fare card. The development of contactless bank cards contributes to increasing the interest for this validation mode.

From the user's standpoint, the bank card is used as a conventional fare card, which means that it must be presented to a validation terminal to access the transit system, for example, when getting into a bus or a streetcar, or entering a subway station.

In the case of a bus or streetcar, the validation terminal is generally located inside the vehicle and disconnected from the control system of the transit system. The user's bank card number is stored in memory of the validation terminal. Periodically, for example at the end of the day every day, the memorized numbers are transferred to the control system of the transit system, for example by means of a dedicated reader which is connected to the validation terminal. The control system of the transit system can thus debit the bank cards, or, for subscribers, verify that the amount of the subscription has been paid for the current period.

In the case of a subway system, the validation terminal is generally located at the entrance of the subway station. It is continuously connected to the servers of the transit system. The users' bank card numbers can thus be processed without delay.

Contrary to conventional fare cards, bank cards do not generally comprise a storing zone onto which the validation terminal can write validation information. The issue of controlling users during their travels thus arises. Indeed, a conductor must be able, at any given time, to verify that a user present in the transit system has validated his fare card (in this case, has presented his bank card to a validation terminal), and possibly the time and location of the validation.

Validation control systems wherein the conductor is equipped with a portable terminal capable of temporarily storing a list of numbers of validated bank cards have been proposed. When the validation terminal is located inside a vehicle (bus, streetcar), the conductor starts the validation process in the vehicle by downloading, from the validation terminal to his portable terminal, the list of card numbers which have been validated. Downloading the list can be carried out by means of contactless communication or by a wired connection, for example of the USB type. Once the list has been downloaded, the conductor walks around the vehicle and requests to be shown the users' fare cards. When a passenger shows a bank card, the control terminal reads the fare card number, compares it to the downloaded list, and indicates whether the validation has indeed been carried out, and possibly the time it was carried out. When the validation terminals are located outside the vehicle and connected to the computer system of the transit system (subway), the conductor, before a control operation, downloads the list of numbers of validated cards directly from the computers of the transit system. When a passenger is being controlled, the control terminal can possibly display the location where the validation was carried out.

A drawback of such a control system resides in the fact that, for security reasons, all the apparatuses intended to store, even temporarily, a list of bank card numbers, must be secured and certified by banks. Securing validation terminals does not pose any particular problem. Indeed, because of their nature and location in high-traffic areas, the risk for these items of equipment to be disassembled and examined by pirates looking to obtain confidential information is very low. In addition, validation terminals can be easily protected by mechanical means of the armored type. Conversely, securing the portable terminals with which the conductors are equipped is significantly more difficult. Indeed, these apparatuses, small in size, can easily be stolen or misappropriated by ill-intentioned individuals who will then be able to extract confidential information therefrom at their leisure. Complex security mechanisms (mechanical, electronic, software, etc.) must then be provided. This leads to a significant increase in the cost of these apparatuses.

SUMMARY OF THE INVENTION

Therefore, an object of an embodiment of the present invention is to provide a system of validation control that overcomes, at least in part, some of the drawbacks of the existing systems.

Another object of an embodiment of the present invention is to provide a system for validating fare cards, wherein the fare card to be validated can be a bank card.

Another object of an embodiment of the present invention is to provide such a system wherein the conductors are equipped with portable control terminals which, at no time, memorize a list of users' bank cards numbers.

Therefore, an embodiment of the present invention provides for a control terminal comprising: means for reading an identification number from an ID; a processing module adapted to implement a one-way function to generate a control number from the identification number; and means for comparing the control number to a reference list.

According to an embodiment of the present invention, the reference list is stored in a memory of the control terminal.

According to an embodiment of the present invention, the reference list is stored in an apparatus, remote from the control terminal, the control terminal further comprising means for remote, real-time communication with this equipment.

According to an embodiment of the present invention, the fare card identification number is a bank card number.

According to an embodiment of the present invention, the one-way function can be modified by means of a variable key.

According to an embodiment of the present invention, the control terminal is portable.

According to an embodiment of the present invention, the control terminal is adapted to be used to control the validation of fare cards in a public transit system.

Another embodiment of the present invention provides for a system for controlling the validation of IDs comprising: a control terminal of the aforementioned type; and a validation terminal comprising means for reading an identification number from an ID, this validation terminal being associated with a processing module adapted to implement a one-way function to generate a control number from the identification number and with means for memorizing the control number in a reference list.

According to an embodiment of the present invention, the one-way function of the control terminal and the one-way function of the validation terminal are identical, and the reference list of the control terminal and the reference list of the validation terminal are at least partially identical.

Another embodiment of the present invention provides for a method for controlling the validation of IDs, comprising the following steps: a) reading an identification number on an ID; b) generating, using a one-way function, a control number from the identification number; and c) verifying that the control number is included in a reference list.

Another embodiment of the present invention provides for using the aforementioned method for controlling the validation of fare cards in a public transit system.

According to an embodiment of the present invention, the fare cards are bank cards.

According to another embodiment of the present invention, there is provided a method for validating fare cards at a control terminal remote from a control system that includes: receiving, from the control system at the control terminal, a reference list of fare card control numbers, wherein each fare card control number in the reference list is generated by performing a one-way function on a fare card identification number corresponding to a fare card with a valid fare; reading, at the control terminal, a fare card identification number from a fare card; generating, at the control terminal, a hashed number from the fare card identification number read from the fare card using the one-way function; and identifying, at the control terminal, the hashed number in the reference list to validate payment of the fare; wherein the fare card control numbers in the reference list and the hashed number are the same bit length, and wherein bit length of the fare card control numbers in the reference list and the hashed number is less than the bit length of the fare card identification number read from the fare card.

According to another embodiment of the present invention, there is provided a system for validating fare cards at a control terminal that includes: a memory for storing a reference list of fare card control numbers received from a control system, wherein each fare card control number in the reference list is generated by performing a one-way function on a fare card identification number corresponding to a fare card with a valid fare; a reading unit configured to read a fare card identification number from a fare card; and a processor coupled to the memory and the reading unit, wherein the processor is configured to validate payment of the fare by performing the one-way function on the fare card identification number read from the fare card to generate a hashed number, and comparing the hashed number to the reference list of fare card control numbers; wherein the fare card control numbers in the reference list and the hashed number are the same bit length, and wherein bit length of the fare card control numbers in the reference list and the hashed number is less than the bit length of the fare card identification number read from the fare card.

BRIEF DESCRIPTION OF THE DRAWINGS

These objects, characteristics, and advantages, as well as others, will be discussed in detail in the description of particular embodiments that follows, given by way of non-limiting examples with reference to the annexed drawings wherein.

DETAILED DESCRIPTION OF THE INVENTION

Figure 1:
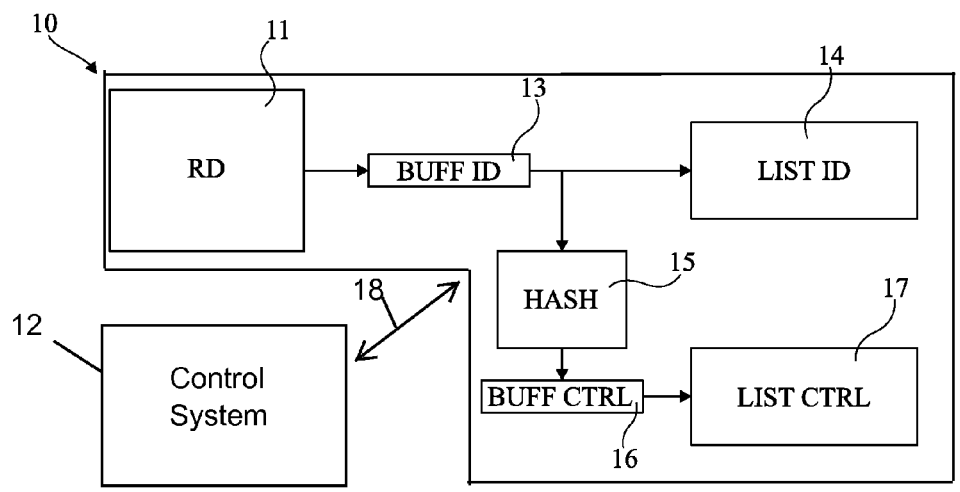
FIG. 1 is a simplified block diagram of an exemplary embodiment of a validation terminal for validating fare cards in a public transit system.

FIG. 1 is a simplified block diagram of an exemplary embodiment of a validation terminal 10 that operates remote from a control system 12 for validating fare cards (not shown) used for purchasing (either directly from a financial account or from a pre-paid subscription) a fare associated with an activity (such as a ride or a performance). For example, the validation terminal 10 together with the control system 12 (which may be distributed or centralized) may operate as part of a fare collection system associated with activities, such as rides or performances, in amusement parks, theaters, and transit systems. In one exemplary embodiment, the validation terminal 10 operates as part of a public transit system that is adapted to be installed in a vehicle, for example, a bus or a streetcar.

The validation terminal 10 comprises a reading unit (RD) 11 adapted to read fare card identification numbers (i.e., ID) associated with a fare card, for example, a bank/credit card or an identification card. The fare card may be read by the validation terminal 10 using contact and/or contactless communication methods. When a fare card is presented to the validation terminal 10, the fare card number or identification number is read by the unit 11, passes through a buffer (BUFF ID) 13, and is saved in a memory (LIST ID) 14. All the numbers of the fare cards validated during a given operating period are saved in the memory 14, so they can be used later by the control system 12 of the fare collection/validation system. Periodically, for example at the end of a day, the fare card numbers in the memory 14 are transferred to servers of the control system 12 over communication link 18, and the memory 14 of the validation terminal 10 is reinitialized.

In addition to being saved in the memory 14, a fare card identification number read using validation terminal 10 passes through a data processing unit (HASH) 15 implementing a one-way function that generates a fare card control number. The term "one-way function" is to be understood as a function which generates, from a first number which it receives at the input, a second number whose value depends on the first number but which does not allow for recreating the first number, even if the function that is used is known. In other words, the one-way function introduces a loss of information which prevents the fare card identification number (e.g., bank card number, user identification number, etc.) from being recreated from the fare card control number. A function referred to as hashing or packing function, adapted to generate, from a fare card identification number that is a bank card number coded in 56 bits, a fare card control number coded in 16 to 32 bits can, for example, be used. In addition to the fact that it must be impossible to recreate the initial fare card identification number from a control number, a function according to which the likelihood of two different fare card identification numbers are transformed into one same control number is relatively low, for example less than 1 for 10, will preferably be chosen.

At the output of the data processing unit 15, the fare card control number passes through a buffer (BUFF CTRL) 16 and is saved in a memory (LIST CTRL) 17 as part of a reference list. It must be noted that the list of fare card control numbers stored as part of a reference list in the memory 17 does not have a confidential character since it may not be used to recreate users' fare card identification numbers. The memory 17 can be periodically reinitialized, for example, at the end of each day.

In practice, the validation terminal 10 can comprise a microcontroller to implement the one-way function (unit 15).

Figure 2:
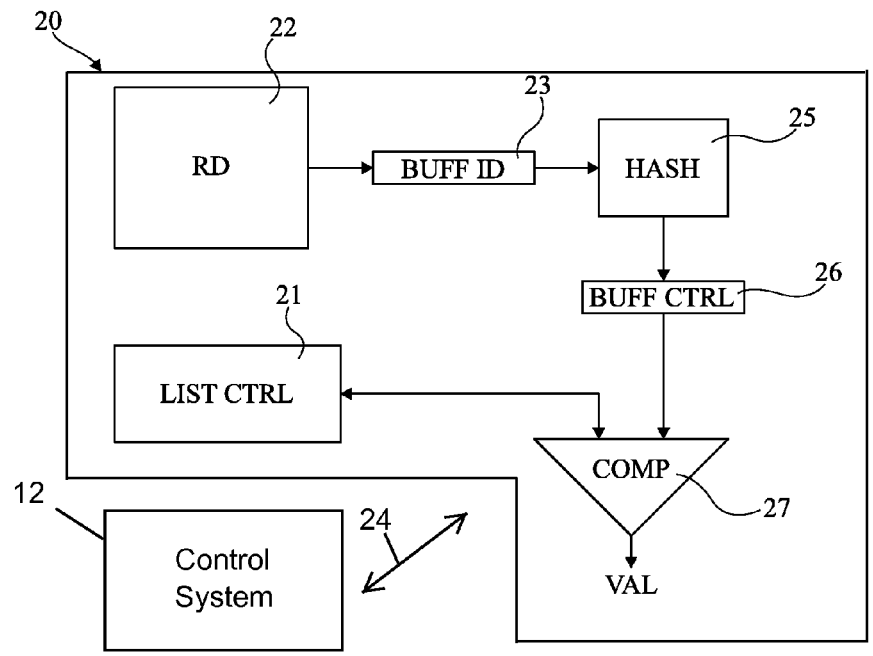
FIG. 2 is a simplified block diagram of an exemplary embodiment of control terminal for controlling the validation of fare cards in a public transit system.

FIG. 2 is a simplified block diagram of an exemplary embodiment of a control terminal 20 for validating payment of a fare (i.e., to determine whether a fare has been paid using a fare card). For example, the control terminal may operate in a public transit system comprising validation terminals 10 of the type described with reference to FIG. 1. In one embodiment, the control terminal is portable. Alternatively, the control terminal may be stationary at, for example, a self-service location (e.g., a network entry point).

The control terminal 20 comprises a memory 21 (LIST CTRL) adapted to contain a reference list of fare card control numbers. The control terminal 20 communicates with the control system 12 over communication link 24, to download a reference list of fare card control numbers into the memory 21 originating, for example, from the memory 17 of one or more validation terminals 10. In an alternate embodiment (not shown), the control terminal 20 communicates with one or more verification terminals 10 (directly, or indirectly through control system 12) to receive the reference list of fare card control numbers from memory 17. The communication links between the control system 12 or the validation terminal 10 and the control terminal 20 can comprise a contactless connection, for example of the radio type, or a wired connection, for example, of the USB type. Alternatively, data to be transferred are displayed on a screen (not shown) of the validation terminal 10 or control system 12 in the form of an optical reading code (for example a bar code), and read by a scanner or equivalent comprised in the control terminal 20. The displaying of data in coded form on the screen of the validation terminal, can, for example, be triggered by the detection of the presence of the control terminal 20 in the vicinity of the validation terminal 10 or control system 12. The control terminal 20 can be detected either simply by its magnetic signature or when the validation terminal 10 or control system 12 receives a request emitted by the control terminal 20. The request message can, in particular, comprise the list of information which the control terminal 20 wishes to receive. Any other adapted communication means can be provided.

The control terminal 20 further comprises a reading unit (RD) 22 adapted to read fare card identification numbers (i.e., ID) associated with a fare card, for example a bank/credit card or an identification card. The fare card may be read by the control terminal 20 using contact and/or contactless communication methods. When a fare card is presented during a control operation (i.e., to determine whether a fare has been paid using the fare card), the fare card identification number is read by the reading unit 22 into a buffer (BUFF ID) 23, then passes through a data processing unit (HASH) 25 using the same one-way function as the processing unit 15 of the validation terminal 10. At the output of the processing unit 25, the fare card control number passes through a buffer 26 (BUFF CTRL). This fare card number is compared to the fare card control numbers stored in the reference list in memory 21 to verify that the user's card corresponds to a card that has been validated (i.e., a fare has been paid using the fare card). The comparison between the control number generated by the unit 25 and the list of fare card control numbers stored in the reference list in memory 21 is implemented by a comparison unit (COMP) 27. The output signal (VAL) of the comparison unit 27 indicates whether the fare card that is presented corresponds to a validated card, and possibly other data including the time the fare card was read by the validation terminal 10.

In practice, the control terminal 20 can comprise a microcontroller, implementing, in particular, the one-way function (unit 25) and the comparison function (unit 27).

Figure 3:
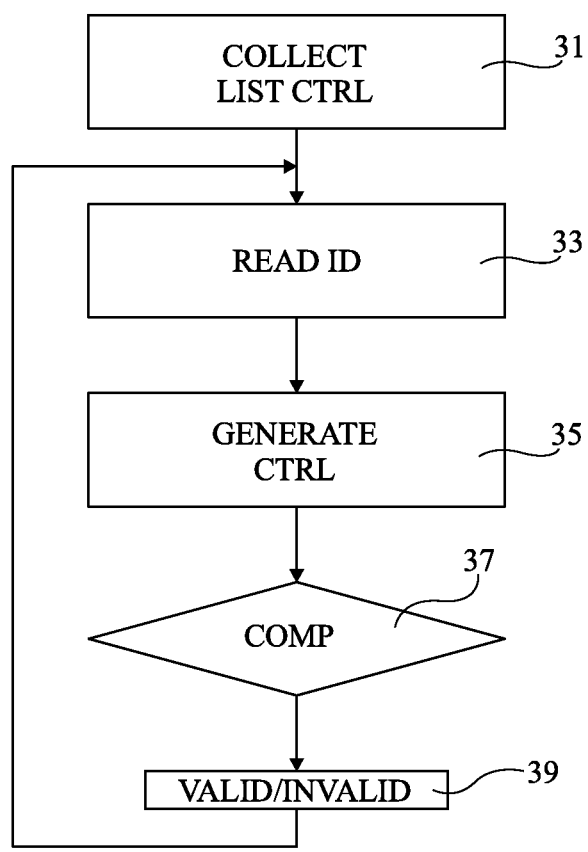
FIG. 3 is a flow diagram showing steps of an exemplary method for controlling the validation of fare cards in a public transit system.

FIG. 3 is a flow diagram showing steps of an exemplary method of control of fare cards validation in a public transit system comprising control system 12, validation terminals 10 of the type described with reference to FIG. 1, and control terminals 20 of the type described with reference to FIG. 2.

During an initial step 31 (COLLECT LIST CTRL), the reference list of fare card control numbers stored in the memory 17 (FIG. 1) of a validation terminal 10 is copied in the memory 21 (FIG. 2) of a control terminal 20. By way of example, the downloading of the reference list in the control terminal 20 takes place at the beginning of the control operation, when for example a conductor enters a vehicle. The reference list contained in the validation terminal 10 can be copied entirely or partially. It can be decided to copy, for example, only the control numbers corresponding to the fare cards validated within the hour preceding the control operation.

Once the reference list has been downloaded to memory 21 in the control terminal 20, in the example embodiment the conductor may walk around the vehicle and requests that the users present their fare cards. In some embodiments, the one-way function may be downloaded together with the reference list to unit 25. In other embodiments, the one-way function may be initialized and/or modified independent of when the reference list is downloaded to unit 25.

During a step 33 (READ ID), in the example embodiment, the control terminal receives a bank card (i.e., more generally referred to as fare card), presented to the conductor by a passenger as a fare card. The passenger's bank card number (i.e., more generally referred to as fare card identification number) is read by the control terminal.

During step 35, the control terminal generates a control number from the bank card number read at step 33 and temporarily memorized in a buffer 23 (FIG. 2) of the control terminal 20. The fare card control number is generated by means of a one-way function and corresponds, for example, to a message digest of the number of the bank card. In one embodiment, the one-way function used to generate the fare card control number (generated from the fare card identification number read at the control terminal 20) is the same as that used to generate the fare card control numbers stored in the memory 21 of the control terminal 20. Those skilled in the art, however, will appreciate that in alternate embodiments two different one-way functions may be used to generate the fare card control numbers; where first one-way function may be used for generating the fare card control number from the fare card identification number read at the control terminal 20, and where the second one-way function may be used for generating the fare card control numbers stored in the memory 21 of the control terminal 20. In one such alternate embodiment, the compare operation performed at step 37 is modified to account for the difference between the different one-way functions used at the validation terminal 10 and the control terminal 20.

During step 37 (COMP), the fare card control number generated at step 35 is compared to the reference list of control numbers stored in the memory 21 of the control terminal 20. When the validation terminal 10 and the control terminal 20 apply the same one-way function, then the operation performed at step 37 is a compare operation between two numbers. Alternatively, when the validation terminal 10 and the control terminal 20 apply different one-way functions, the operation performed at step 37 is more than a compare to account for the different one-way functions. Examples of such operations include: an exclusive OR operation that yields a result equal to zero if the fare card identification numbers are the same; an exclusive OR operation that yields a result not equal to zero if the fare card identification numbers are the same; and a subtraction operation that yields a result not equal to zero if the fare card identification numbers are the same.

At the end of the comparison step 37, during a displaying step 39 (VALID/INVALID), the control terminal 20 shows in this example embodiment the conductor whether the passenger has paid or not.

Steps 33, 35, 37, and 39 are reiterated for each passenger that is controlled. It must be noted that, with each iteration, the buffer 23 of the control terminal 20 through which passes the passenger's identification number (bank card number) is reinitialized.

An advantage of the proposed control system described in this example embodiment is that, at no time does the control terminal 20 held by the conductor contain a list of bank card numbers of the transit system users. Thus, it is not necessary to provide for complex means for securing the control terminal 20, and it is not necessary either for the control terminal 20 to be certified by a bank. This makes it possible to significantly reduce the cost of the control terminal 20 with respect to existing systems.

The reference list of fare card control numbers generated from the bank card numbers of users constitutes a reference list which the control terminal 20 can access to verify that a user's bank card has indeed been validated.

It is to be noted that the proposed system guarantees that a user having correctly validated his card shall not wrongly be considered as a defrauder. Indeed, since the same one-way function is used in both the validation terminal 10 and the control terminal 20, the same control number is generated by these two apparatuses.

On the other hand, it can happen that a defrauder presenting a non-validated card be wrongly considered as rightful. Indeed, it is possible that, from two distinct fare card identification numbers, the same fare card control number may be generated by the one-way function. However, the probability for such a situation to arise is relatively low. In addition, even if the probability is on the order of one to ten, this remains extremely dissuasive to defrauders, the latter not being able to know ahead of time if the control number generated from their bank card is in the reference list of fare card control numbers corresponding to correctly validated cards.

However, it will be preferably provided to regularly modify the one-way function used by the system, for example, by means of a variable key. Indeed, if the one-way function remains unchanged for a long period of time, or if this function is publicly known, there is a risk that passengers might find out that their respective identification numbers lead to generating the same control number. These passengers could then become associated to one another to travel in group while paying for only one trip.

The proposed validation control system is not concerned with the consistency of the identification number. The control terminal 20 only verifies that the fare card control number is part of the reference list. The risk that the consistency of the bank card number (i.e., fare card identification number) is not verified must be accepted, this verification being generally carried out when the bank card number is debited.

Particular embodiments of the present invention have been described. Various alternatives and modifications will become apparent to one having ordinary skill in the art.

In particular, the invention is not limited to the example described with reference to FIGS. 1 to 3, wherein the reference list of fare card control numbers corresponding to the validated cards is memorized in the validation terminal 10. One having ordinary skill in the art shall know how to provide for alternatives wherein, rather than being stored in the validation terminal per se, the reference list of fare card control numbers is stored in the control system 12 that forms a remote server (case of a subway system, for example). In this case, the control numbers can be generated directly by the server.

Further, the invention is not limited to the operation mode described hereinabove, wherein the control numbers are being generated as the users' cards are being validated. An alternative wherein the reference list of fare card control numbers is generated only at the beginning of the control operation, upon request from a conductor's control terminal 20, could be provided.

In addition, the invention is not limited to the operation mode described hereinabove, wherein the control terminal 20 contains a reference list of fare card control numbers corresponding to validated fare cards (i.e., a fare card with a valid fare). One having ordinary skill in the art shall know how to provide for an alternative wherein the control terminal 20 of the conductor communicates remotely and in real time with the validation terminal 10 or with a remote central server to retrieve information from a reference list of fare card control numbers stored in this validation terminal or in this server.

In addition, the invention has been described relative to an application to a system for controlling the validation of fare cards in a public transit system wherein users can use a bank card as fare card. The invention is not limited to this particular application. The proposed system can be used for applications of authorization control in other fields. In this case, the control terminal is not necessarily portable. Further, the proposed system can function with identification documents (i.e., ID) other than bank cards. For example, the ID can be an employee's badge or any other document comprising a personal or confidential identification number.

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments of the invention. As such, alternative ordering of the steps, performing one or more steps in parallel, and/or performing additional or fewer steps may be done in alternative embodiments of the invention.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

A set of machines or cloud embodying the invention may involve one or more centralized or distributed processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims. Those skilled in the art will recognize that memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other wired or wireless network systems/communication links.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for validating fare cards at a control terminal remote from a control system, comprising:
   receiving, from the control system at the control terminal, a reference list of fare card control numbers, wherein each fare card control number in the reference list is generated by performing a one-way function on a fare card identification number corresponding to a fare card with a valid fare;
   reading, at the control terminal, a fare card identification number from a fare card;
   generating, at the control terminal, a hashed number from the fare card identification number read from the fare card using the one-way function; and
   identifying, at the control terminal, the hashed number in the reference list to validate payment of the fare,
   wherein the fare card control numbers in the reference list and the hashed number are the same bit length, and wherein bit length of the fare card control numbers in the reference list and the hashed number is less than the bit length of the fare card identification number read from the fare card.

2. The method of claim 1, wherein the one-way function used to generate the hashed number is different from the one-way function used to generate each fare card control number in the reference list.

3. The method of claim 1, wherein said receiving further comprises receiving a variable key from the control system to modify the one-way function.

4. The method of claim 1, wherein said receiving receives the one-way function from the control system at the control terminal with the reference list of fare card control numbers.

5. The method of claim 1, wherein the control terminal is portable.

6. The method of claim 1, wherein the fare card control number and the hashed number are the same bit length and are each from 16 to 32 bits long, and wherein the fare card identification number is 56 bits long.

7. The method of claim 1, wherein the fare card identification number is a financial account number.

8. The method of claim 7, wherein the fare card identification number is a credit card number.

9. The method of claim 8, wherein the fare is a public transit fare.

10. The method of claim 1, wherein the control system is one of a distributed system and a central system.

11. The method of claim 1, wherein the one-way function generates the same fare card control number for two different fare card identification numbers.

12. A system for validating fare cards at a control terminal, comprising:
   a memory for storing a reference list of fare card control numbers received from a control system, wherein each fare card control number in the reference list is generated by performing a one-way function on a fare card identification number corresponding to a fare card with a valid fare;
   a reading unit configured to read a fare card identification number from a fare card; and
   a processor coupled to the memory and the reading unit, wherein the processor is configured to validate payment of the fare by performing the one-way function on the fare card identification number read from the fare card to generate a hashed number, and comparing the hashed number to the reference list of fare card control numbers,
   wherein the fare card control numbers in the reference list and the hashed number are the same bit length, and wherein bit length of the fare card control numbers in the reference list and the hashed number is less than the bit length of the fare card identification number read from the fare card.

13. The system of claim 12, wherein the one-way function does not allow the fare card identification number to be recreated when the fare card control number and the one-way function are known.

14. The system of claim 12, wherein the processor is further configured to indicate that the fare has been paid when the hashed number is the same as a fare card control number, and indicating that the fare has not been paid when the hashed number is not the same as a fare card control number.

15. The system of claim 12, wherein the fare card control number and the hashed number are the same bit length and are each from 16 to 32 bits long, and wherein the fare card identification number is 56 bits long.

16. The system of claim 12, wherein the fare card is a credit card.

17. The system of claim 12, wherein the one-way function is configured to generate the same fare card control numbers in the reference list for two different fare card identification numbers.

18. The system of claim 12, wherein the control terminal is further configured to periodically change the one-way function using a variable key.

19. The system of claim 12, further comprising a validation terminal comprising a reading unit for reading a fare card identification number from a fare card, the validation terminal being associated with a processing module adapted to implement the one-way function to generate a fare card control number from a fare card identification number, and to store the fare card control number in the reference list.

20. The system of claim 19, wherein the reference list of the control terminal includes only part of the reference list of the validation terminal.

21. The system according to claim 19, wherein the validation terminal and the control terminal both periodically change the one-way function using a variable key.

22. The system of claim 12, wherein the one-way function used to generate the hashed number is different from the one-way function used to generate each fare card control number in the reference list.

23. An article of manufacture for use in a machine, comprising:
   a memory;
   instructions stored in the memory for validating fare cards at a control terminal remote from a control system by:
   receiving, from the control system at the control terminal, a reference list of fare card control numbers, wherein each fare card control number in the reference list is generated by performing a one-way function on a fare card identification number corresponding to a fare card with a valid fare;
   reading, at the control terminal, a fare card identification number from a fare card;
   generating, at the control terminal, a hashed number from the fare card identification number read from the fare card using the one-way function; and
   identifying, at the control terminal, the hashed number in the reference list to validate payment of the fare,
   wherein the fare card control numbers in the reference list and the hashed number are the same bit length, and wherein bit length of the fare card control numbers in the reference list and the hashed number is less than the bit length of the fare card identification number read from the fare card.

24. The article of manufacture of claim 23, wherein the one-way function used to generate the hashed number is different from the one-way function used to generate each fare card control number in the reference list.

* * * * *